(12) United States Patent
Norizuki et al.

(10) Patent No.: US 6,199,174 B1
(45) Date of Patent: Mar. 6, 2001

(54) ABNORMALITY RECOVERY SYSTEM

(75) Inventors: Akira Norizuki; Katsumi Murakami; Hiroshi Nishiyama; Katsutoshi Nakajima, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/060,253

(22) Filed: Apr. 15, 1998

(30) Foreign Application Priority Data

Apr. 15, 1997 (JP) .................................................. 9-097554

(51) Int. Cl.[7] .............................. H02H 3/05; H05K 10/00
(52) U.S. Cl. ...................................... 714/4; 714/2; 714/16; 714/717
(58) Field of Search .............................. 714/4, 2, 16, 18, 714/712, 716, 717

(56) References Cited

U.S. PATENT DOCUMENTS

| | | | |
|---|---|---|---|
| 4,354,267 | * | 10/1982 | Mori et al. ................................ 714/4 |
| 4,417,242 | * | 11/1983 | Bapst et al. ...................... 340/825.05 |
| 4,593,154 | * | 6/1986 | Takeda et al. ........................ 178/2 D |
| 4,752,924 | * | 6/1988 | Darnell et al. ........................ 370/431 |
| 5,151,898 | * | 9/1992 | Kondo .................................. 370/460 |
| 5,153,874 | * | 10/1992 | Kohno .................................. 370/228 |
| 5,191,579 | * | 3/1993 | Matsushita et al. ................. 370/224 |
| 5,463,634 | * | 10/1995 | Smith et al. .......................... 714/717 |
| 5,479,406 | * | 12/1995 | Matsutani ........................ 340/825.08 |
| 5,565,856 | * | 10/1996 | Takaba et al. .................. 340/825.16 |
| 5,802,320 | * | 9/1998 | Baehr et al. .......................... 709/249 |

FOREIGN PATENT DOCUMENTS

| | | | |
|---|---|---|---|
| 6-30477 | 2/1994 | (JP) | ................................ H04Q/9/00 |
| 6-350678 | 12/1994 | (JP) | ................................ H04L/29/14 |
| 7-87065 | 3/1995 | (JP) | ................................. H04L/1/00 |

\* cited by examiner

*Primary Examiner*—Dieu-Minh T. Le
(74) *Attorney, Agent, or Firm*—Morgan, Lewis & Bockius LLP

(57) ABSTRACT

An abnormality recovery system in a network comprising a plurality of station units connected by a ring-like data transmission line enabling circular transmission of communication data in digital form in a single direction. In the system, when it is determined that an abnormality occurs in a communication IC, a CPU performs switch control to switch a communication data route so as to bypass the communication IC and send communication data on a bypass from an optical receiver to an optical transmitter.

6 Claims, 2 Drawing Sheets

ABNORMALITY RECOVERY SYSTEM

BACKGROUND OF THE INVENTION

1. Field of the Invention

This invention relates to a network comprising a plurality of station units connected by a ring-like data transmission line enabling circular transmission of communication data in digital form in a single direction and, in particular to an abnormality recovery system in a network capable of maintaining a data transmission function in the network even if communication means being provided for each station unit for governing reception and transmission of communication data falls into an abnormal condition.

2. Description of the Related Art

Hitherto, a network generally has been known which comprises a plurality of station units connected by a ring-like data transmission line enabling circular transmission of communication data in digital form in a single direction.

To exchange communication data between station units in a network configured as described above, first a communication IC for governing reception and transmission of communication data is provided for each station unit and the communication data is sent from the communication IC in the station unit of the transmitting party in a predetermined direction on a data transmission line. The communication IC in the station unit downstream from the transmitting party on the data transmission line determines whether or not the home station unit is specified as the receiving party. If the home station unit is not specified as the receiving party, the communication IC sends the communication data to the station unit downstream from the home station unit. On the other hand, if the home station unit is specified as the receiving party, the communication IC reads the communication data over the data transmission line, thereby exchanging the communication data between the station units.

However, according to the conventional network as described above, if an abnormal condition such as a failure occurs in the communication IC in a station unit at a midpoint position on the route between the transmitting party and the receiving party, the communication data cannot be transmitted to station units downstream from the station unit falling into the abnormal condition. Resultantly, a problem of impairing the data transmission function in the network, to be solved is involved.

SUMMARY OF THE INVENTION

It is therefore an object of the invention to provide an abnormality recovery system in a network capable of maintaining a data transmission function in the network by, if communication means for governing reception and transmission of communication data falls into an abnormal condition, allowing communication data to pass through the station unit including the communication means in the abnormal condition and be sent to the next station unit.

In order to achieve the above object, according to the invention, there is provided an abnormality recovery system in a network comprising a plurality of station units connected by a ring-like data transmission line enabling circular transmission of communication data in digital form in a single direction, wherein each of the plurality of station units comprises: reception means for receiving communication data over the data transmission line; transmission means for sending communication data to the data transmission line; communication means for taking the communication data received at the reception means and sending the communication data to the transmission means; a bypass used to bypass the communication means and send the communication data from the reception means to the transmission means; communication abnormality determination means for determining whether or not an abnormality occurs in the communication means; and switch control means, when the communication abnormality determination means determines that an abnormality occurs in the communication means, for performing switch control to switch a communication data route so as to bypass the communication means and send the communication data on the bypass from the reception means to the transmission means.

Further, there is provided an abnormality recovery system in a network comprising a plurality of station units connected by a ring-like data transmission line enabling circular transmission of communication data in digital form in a single direction, wherein each of the plurality of station units comprises: reception means for receiving communication data over the data transmission line; transmission means for sending communication data to the data transmission line; communication means for taking the communication data received at the reception means and sending the communication data to the transmission means; a bypass used to bypass the communication means and send the communication data from the reception means to the transmission means; reception state determination means for monitoring a communication data reception state at the reception means and determining whether or not the reception state is good; arrival determination means for determining whether or not the communication data sent from the transmission means has arrived at the station unit as a receiving party; and switch control means, when the reception state determination means determines that the communication data reception state is good and the arrival determination means determines that the communication data has not arrived at the receiving party, for performing switch control to switch a communication data route so as to bypass the communication means and send the communication data on the bypass from the reception means to the transmission means.

Further, there is provided an abnormality recovery system in a network comprising a plurality of station units connected by a ring-like data transmission line enabling circular transmission of communication data in digital form in a single direction and adopting a master/slave method as a communication method, wherein each of slave station units of the plurality of station units comprises: reception means for receiving communication data over the data transmission line; transmission means for sending communication data to the data transmission line; communication means for taking the communication data received at the reception means and sending the communication data to the transmission means; a bypass used to bypass the communication means and send the communication data from the reception means to the transmission means; communication abnormality determination means for determining whether or not an abnormality occurs in the communication means; and switch control means, when the communication abnormality determination means determines that an abnormality occurs in the communication means, for performing switch control to switch a communication data route so as to bypass the communication means and send the communication data on the bypass from the reception means to the transmission means.

Furthermore, there is provided an abnormality recovery system in a network comprising a plurality of station units connected by a ring-like data transmission line enabling circular transmission of communication data in digital form in a single direction and adopting a master/slave method as a communication method, wherein each of slave station units of the plurality of station units comprises: reception means for receiving communication data over the data transmission line; transmission means for sending communication data to the data transmission line; communication means for taking the communication data received at the reception means and sending the communication data to the transmission means; a bypass used to bypass the communication means and send the communication data from the reception means to the transmission means; reception state determination means for monitoring a communication data reception state at the reception means and determining whether or not the reception state is good; arrival determination means for determining whether or not the communication data sent from the transmission means has arrived at the station unit as a receiving party; and switch control means, when the reception state determination means determines that the communication data reception state is good and the arrival determination means determines that the communication data has not arrived at the receiving party, for performing switch control to switch a communication data route so as to bypass the communication means and send the communication data on the bypass from the reception means to the transmission means.

DETAILED DESCRIPTION OF THE PREFERRED EMBODIMENT

Referring now to the accompanying drawings, there is shown a preferred embodiment of an abnormality recovery system in a network according to the invention.

Figure 1:
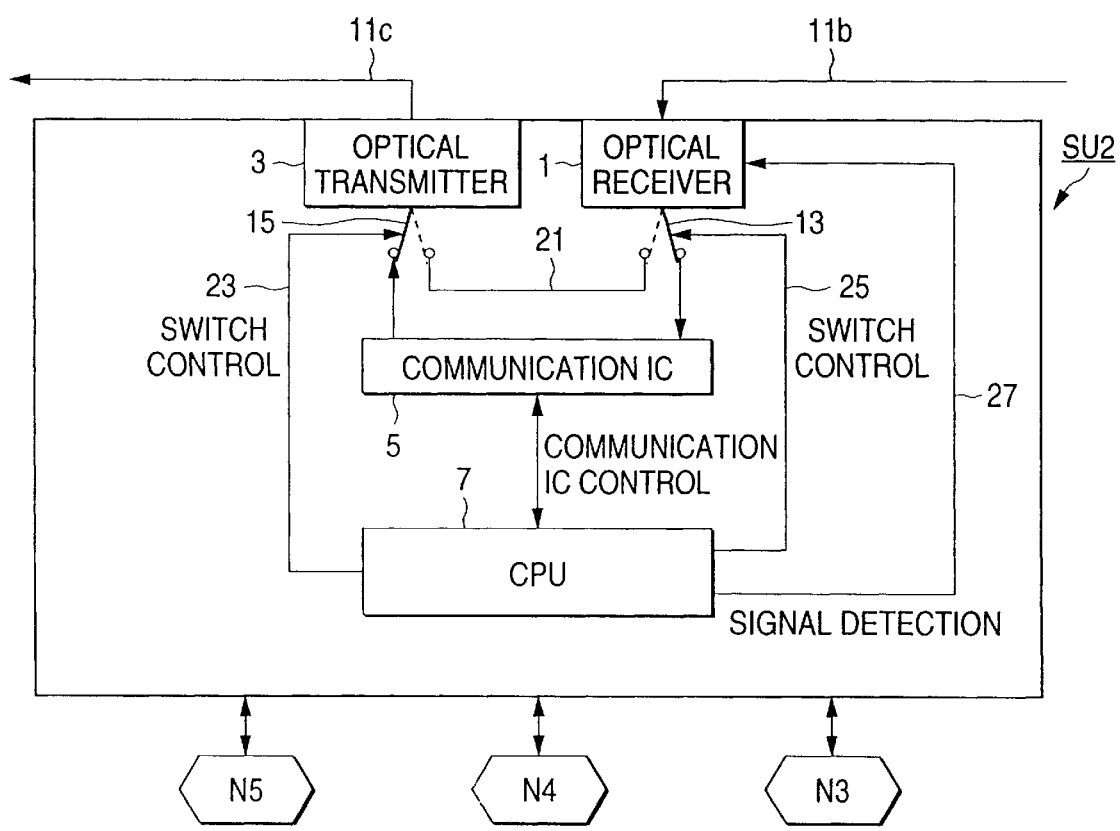
FIG. 1 is a schematic block diagram of the periphery of an abnormality recovery system according to the invention.
Figure 2:
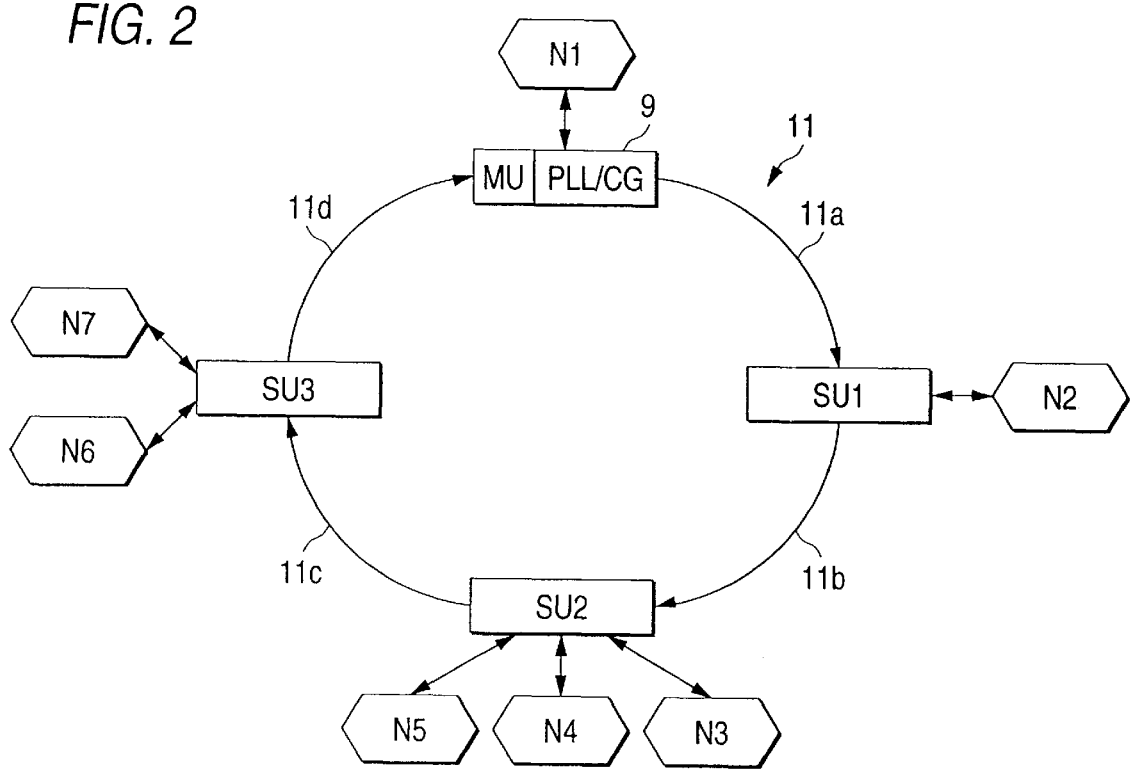
FIG. 2 is a block diagram of a network to which the abnormality recovery system according to the invention is applied.
Figure 3:
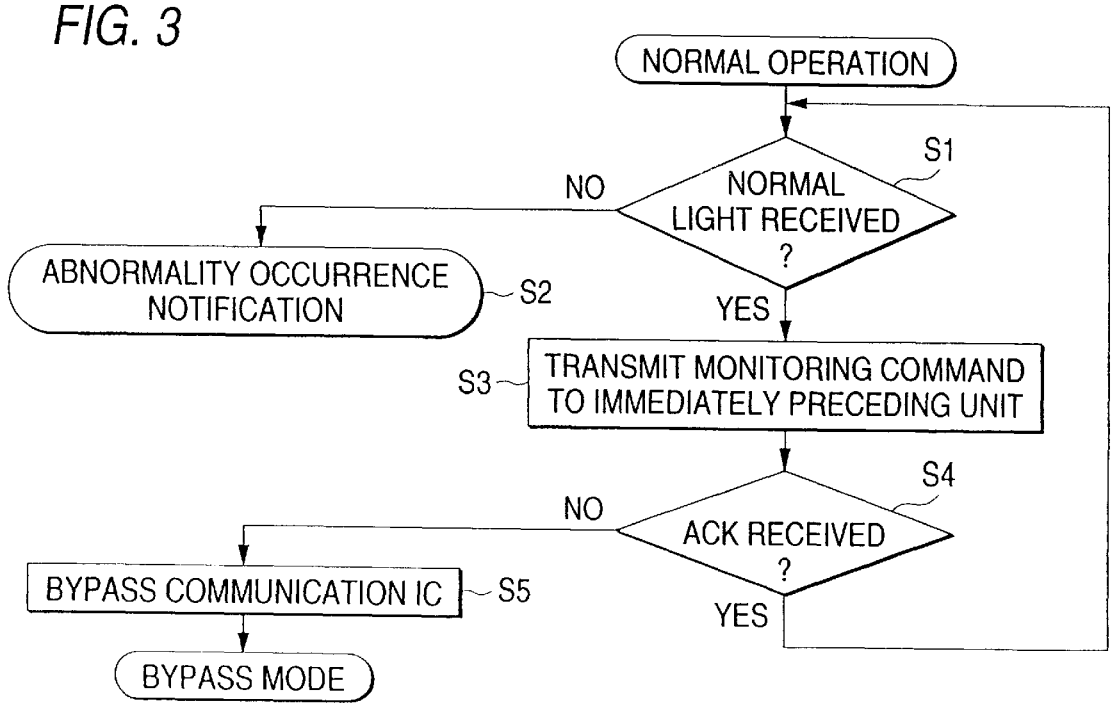
FIG. 3 is a flowchart of the operation of the abnormality recovery system according to the invention.

FIG. 1 is a schematic block diagram of the periphery of an abnormality recovery system according to the invention. FIG. 2 is a block diagram of a network to which the abnormality recovery system according to the invention is applied. FIG. 3 is a flowchart of the operation of the abnormality recovery system according to the invention. An embodiment of applying the abnormality recovery system according to the invention to a network for connecting various devices disposed in the room of a vehicle will be discussed.

First, the configuration of the network to which the abnormality recovery system according to the invention is applied will be discussed with reference to FIG. 2. The network comprises a plurality of station units connected by a ring-like data transmission line 11 exhibiting topology enabling transmission of digital data in a single direction. Digital data is sent in a single direction from each station unit to the data transmission line 11, whereby the station units can exchange the digital data with each other. An appropriate communication cable, such as a plastic optical fiber or an electric wire, can be adopted as the data transmission line 11. The embodiment adopts a plastic optical fiber as the data transmission line 11 and circulates digital data clockwise for transmission.

A master/slave method is adopted as a communication method among the station units in the network, wherein one of the station units operates as a master station unit MU and others operate as slave station units SUs.

A suitable device N1, such as a compact disc (CD) changer, an audio amplifier, a digital video disc (DVD) unit, a radio receiver, a portable telephone, a navigation system, or a digital television set, is connected to the master station unit MU. More than one device can also be connected to the master station unit MU. The master station unit MU contains a phase locked loop/clock generator (PLL/CG) 9 having the capabilities of generating a reference clock such as a system clock SYCLK used as the operation timing of the whole network system and maintaining the phase of the generated reference clock with high accuracy. It has the capabilities of taking various pieces of data including source data such as digital audio data or digital video data, device control data, etc., sent from the device N1, adding header information containing transmitting and receiving parties to the various pieces of data and the system clock SYCLK supplied from the PLL/CG 9 to produce a packet, performing modulation for the packet data, and sending the modulated packet data to the data transmission line 11. On the other hand, the master station unit MU has the capabilities of taking various pieces of data sent from the slave station units SUs, performing demodulation for the various pieces of data, and selectively sending the demodulated data to the device N1.

One or more devices N2 to N7 are respectively connected to the slave station units SU1, SU2, and SU3. Each slave station unit SU has the capabilities of taking packet data sent from the master station MU or any other slave station unit SU, performing demodulation for the taken packet data, and selectively distributing various pieces of data to the devices N2 to N7 in synchronization with the system clock SYCLK, etc., obtained from the demodulated data. On the other hand, each slave station unit SU has the capabilities of taking various pieces of data sent from the devices N2 to N7, adding header information to the various pieces of data to produce a packet, performing modulation for the packet data, and sending the modulated packet data to the data transmission line 11.

Next, the slave station units SUs comprising the abnormality recovery system according to the invention will be discussed with reference to FIG. 1 by taking the slave station unit SU2 as an example.

As shown in FIG. 1, the slave station unit SU2 comprises an optical receiver 1 as reception means for receiving light containing various pieces of data sent in light signal form from the slave station unit SU1 over a data transmission line 11b, converting the received light signal into electric signal form, and sending packet data containing the various pieces of data converted into the electric signal form; a communication IC 5 as communication means having the capabilities of taking the packet data sent from the optical receiver 1, performing demodulation for the taken packet data, and selectively distributing the various pieces of data to the devices N3 to N5 in synchronization with the system clock SYCLK, etc., obtained from the demodulated data, as well as taking various pieces of data sent from the devices N3 to N5, adding header information to the various pieces of data to produce a packet, performing modulation for the packet data, and sending the modulated packet data to the data transmission line 11; an optical transmitter 3 as transmission means for converting the packet data in electric signal form sent from the communication IC 5 into light signal form and sending the packet data converted into the light signal form to a data transmission line 11c in light blink form; a bypass 21 placed as wiring capable of bypassing the communication IC 5 and sending the packet data sent from the optical receiver 1 directly to the optical transmitter 3; an optical reception side route switch section 13 for selectively switching the route to which the packet data sent from the optical receiver 1 is sent into either the communication IC 5 or the bypass 21; an optical transmission side route switch section 15 for selectively switching the route from which the packet data is sent into either the communication IC 5 or the bypass 21; and a central processing unit (CPU) 7 as communication abnormality determination means, switch control means, reception state determination means, and arrival determination means for performing operation monitor and operation control of the communication IC 5, continuously taking and monitoring the optical reception state in the optical receiver 1 over a communication line 27, and when determining that the communication IC 5 falls into an abnormal condition, performing switch control for causing the optical reception side route switch section 13 and the optical transmission side route switch section 15 to switch the route so as to bypass the communication IC 5 and send the packet data sent from the optical receiver 1 directly to the optical transmitter 3 over communication lines 23 and 25.

Next, the operation of the abnormality recovery system in the network according to the invention will be discussed with reference to FIG. 3.

First, at step S1, the CPU 7 continuously takes and monitors the optical reception state in the optical receiver 1 over the communication line 27 and determines whether or not the optical receiver 1 receives a normal light signal. If the optical receiver 1 does not receive a normal light signal as a result of the light signal reception determination at step S1, the CPU 7 assumes some abnormality to occur in the optical receiver 1, the light signal route to the optical receiver 1, or any other station unit and instructs the communication IC 5 to transmit an abnormality occurrence notification at step S2.

On the other hand, if the optical receiver 1 receives a normal light signal as a result of the light signal reception determination at step S1, the CPU 7 instructs the communication IC 5 to transmit a monitoring command to the immediately preceding station unit at step S3. Upon reception of the monitoring command transmission instruction, the communication IC 5 adds header information specifying the home station unit as the transmitting party and the immediately preceding station unit as the receiving party to the monitoring command to be transmitted to produce a packet, performs modulation for the packet data, and sends the modulated packet data to the optical transmitter 3, which then converts the packet data sent from the communication IC 5 into light signal form and sends the packet data converted into the light signal form to the data transmission line 11 in light blink form. The station unit specified as the receiving party adds acknowledge (ACK) code indicating that the packet data has been received to the packet data and returns the packet data with the ACK code over the data transmission line 11 to the transmitting station unit.

Next, the CPU 7 determines whether or not the returned packet data contains ACK code at step S4. If the returned packet data contains ACK code as a result of the ACK reception determination at step S4, the CPU 7 returns control to step S1 and repeats the process. On the other hand, if the returned packet data does not contain ACK code, namely, if normal data communication does not hold although the light signal is received, the CPU 7 assumes that the communication IC 5 in the home station unit falls into an abnormal condition and performs switch control for causing the optical reception side route switch section 13 and the optical transmission route switch section 15 to switch the route so as to bypass the communication IC 5 and sending the packet data sent from the optical receiver 1 directly to the optical transmitter 3 over communication lines 23 and 25 at step S5. At this time, although the slave station unit SU which does not take the packet data and allows the packet data to simply pass through is connected to the network, it is handled by the master station unit MU or any other slave station unit SU as if it were removed from the network.

Thus, according to the abnormality recovery system in the network according to the invention, the packet data arriving at a slave station unit SU when the communication IC 5 in the slave station unit SU falls into an abnormal condition is allowed to pass through the slave station unit SU in the abnormal condition and be sent to the next station unit, so that if the communication IC 5 falls into an abnormal condition, the data transmission function in the network can be maintained. The master station unit MU can keep track of the fact that there is a slave station unit SU which does not take the packet data and allows the packet data to simply pass through and address information capable of specifying the slave station unit SU, so that maintenance of the network can be easily accomplished.

If the optical receiver 1 does not receive a normal light signal as a result of the light signal reception determination at step S1, the communication IC 5 can also be bypassed at step S5 in place of transmitting an abnormality occurrence notification at step S2.

As many apparently widely different embodiments of the invention may be made without departing from the spirit and scope thereof, it is to be understood that the invention is not limited to the specific embodiments thereof except as defined in the appended claims.

According to the invention, the communication data arriving when the communication means falls into an abnormal condition is allowed to pass through the station unit including the communication means in the abnormal condition and be sent to the next station unit, so that if the communication means falls into an abnormal condition, the data transmission function in the network can be maintained.

What is claimed is:

1. In an abnormality recovery system in a network comprising a plurality of station units connected by a ring-like data transmission line enabling circular transmission of communication data in digital form in a single direction, the improvement wherein each of said plurality of station units comprises:
reception means for receiving communication data over said data transmission line;
transmission means for sending communication data to said data transmission line;
communication means for taking the communication data received at said reception means and sending the communication data to said transmission means;
a bypass used to bypass said communication means and send the communication data from said reception means to said transmission means;
communication abnormality determination means for determining whether or not an abnormality occurs in said communication means; and
switch control means, when said communication abnormality determination means determines that an abnormality occurs in said communication means, for performing switch control to switch a communication data route so as to bypass said communication means and send the communication data on said bypass from said reception means to said transmission means.

2. In an abnormality recovery system in a network comprising a plurality of station units connected by a ring-like data transmission line enabling circular transmission of communication data in digital form in a single direction, the improvement wherein each of said plurality of station units comprises:
reception means for receiving communication data over said data transmission line;
transmission means for sending communication data to said data transmission line;
communication means for taking the communication data received at said reception means and sending the communication data to said transmission means;
a bypass used to bypass said communication means and send the communication data from said reception means to said transmission means;
reception state determination means for monitoring a communication data reception state at said reception means and determining whether or not the reception state is good;
arrival determination means for determining whether or not the communication data sent from said transmission means has arrived at the station unit as a receiving party; and
switch control means, when said reception state determination means determines that the communication data reception state is good and said arrival determination means determines that the communication data has not arrived at the receiving party, for performing switch control to switch a communication data route so as to bypass said communication means and send the communication data on said bypass from said reception means to said transmission means.

3. The abnormality recovery system as claimed in claim 2, wherein said arrival determination means determines whether or not the communication data sent from said transmission means has arrived at the station unit as the receiving party based on the fact as to whether or not communication data containing ACK code has been returned from the station unit as the receiving party.

4. In an abnormality recovery system in a network comprising a plurality of station units connected by a ring-like data transmission line enabling circular transmission of communication data in digital form in a single direction and adopting a master/slave method as a communication method, the improvement wherein each of slave station units of said plurality of station units comprises:
reception means for receiving communication data over said data transmission line;
transmission means for sending communication data to said data transmission line;
communication means for taking the communication data received at said reception means and sending the communication data to said transmission means;
a bypass used to bypass said communication means and send the communication data from said reception means to said transmission means;
communication abnormality determination means for determining whether or not an abnormality occurs in said communication means; and
switch control means, when said communication abnormality determination means determines that an abnormality occurs in said communication means, for performing switch control to switch a communication data route so as to bypass said communication means and send the communication data on said bypass from said reception means to said transmission means.

5. In an abnormality recovery system in a network comprising a plurality of station units connected by a ring-like data transmission line enabling circular transmission of communication data in digital form in a single direction and adopting a master/slave method as a communication method, the improvement wherein each of slave station units of said plurality of station units comprises:
reception means for receiving communication data over said data transmission line;
transmission means for sending communication data to said data transmission line;
communication means for taking the communication data received at said reception means and sending the communication data to said transmission means;
a bypass used to bypass said communication means and send the communication data from said reception means to said transmission means;
reception state determination means for monitoring a communication data reception state at said reception means and determining whether or not the reception state is good;
arrival determination means for determining whether or not the communication data sent from said transmission means has arrived at the station unit as a receiving party; and
switch control means, when said reception state determination means determines that the communication data reception state is good and said arrival determination means determines that the communication data has not arrived at the receiving party, for performing switch control to switch a communication data route so as to bypass said communication means and send the communication data on said bypass from said reception means to said transmission means.

6. The abnormality recovery system as claimed in claim 5, wherein said arrival determination means determines whether or not the communication data sent from said transmission means has arrived at the station unit as the receiving party based on the fact as to whether or not communication data containing ACK code has been returned from the station unit as the receiving party.

* * * * *